(12) United States Patent
Kalofonos

(10) Patent No.: US 8,265,069 B2
(45) Date of Patent: Sep. 11, 2012

(54) SYSTEM, TERMINAL, METHOD, AND COMPUTER PROGRAM PRODUCT FOR ESTABLISHING A TRANSPORT-LEVEL CONNECTION WITH A SERVER LOCATED BEHIND A NETWORK ADDRESS TRANSLATOR AND/OR FIREWALL

(75) Inventor: Dimitrios Kalofonos, Cambridge, MA (US)

(73) Assignee: Nokia Corporation, Espoo (FI)

( * ) Notice: Subject to any disclaimer, the term of this patent is extended or adjusted under 35 U.S.C. 154(b) by 1004 days.

(21) Appl. No.: 11/159,759

(22) Filed: Jun. 23, 2005

(65) Prior Publication Data

US 2006/0291502 A1 Dec. 28, 2006

(51) Int. Cl.
H04L 12/66 (2006.01)
(52) U.S. Cl. .......................................... 370/354; 726/11
(58) Field of Classification Search .......... 370/352–356; 726/11–15
See application file for complete search history.

(56) References Cited

U.S. PATENT DOCUMENTS

| | | | |
|---|---|---|---|
| 6,907,034 B1 | 6/2005 | Begis | |
| 7,296,002 B2* | 11/2007 | Shafiee et al. | 705/50 |
| 7,406,709 B2* | 7/2008 | Maher et al. | 726/12 |
| 2002/0051463 A1* | 5/2002 | Higuchi | 370/352 |
| 2002/0083342 A1 | 6/2002 | Webb et al. | |
| 2002/0114318 A1* | 8/2002 | Rines | 370/352 |
| 2002/0141384 A1* | 10/2002 | Liu et al. | 370/352 |
| 2003/0105763 A1* | 6/2003 | Chatfield et al. | 707/10 |
| 2003/0188001 A1* | 10/2003 | Eisenberg et al. | 709/229 |
| 2003/0202507 A1* | 10/2003 | Nishida et al. | 370/352 |
| 2003/0227939 A1* | 12/2003 | Yukie et al. | 370/465 |
| 2004/0052240 A1* | 3/2004 | Stahl et al. | 370/351 |
| 2004/0176128 A1* | 9/2004 | Grabelsky et al. | 455/553.1 |
| 2007/0230668 A1* | 10/2007 | Brown et al. | 379/88.14 |
| 2010/0183032 A1* | 7/2010 | Michalewicz et al. | 370/474 |

FOREIGN PATENT DOCUMENTS

| | | |
|---|---|---|
| EP | 0690599 A2 | 1/1996 |
| JP | 08051468 A | 2/1996 |
| JP | 10-155034 | 6/1998 |
| JP | 2003-037635 A | 2/2003 |
| JP | 2003-234843 | 8/2003 |

(Continued)

OTHER PUBLICATIONS

Office Action dated Aug. 17, 2009 of corresponding Korean Patent Application No. 10-2008-7001761.

(Continued)

*Primary Examiner* — Pao Sinkantarakorn
(74) *Attorney, Agent, or Firm* — Alston & Bird LLP

(57) ABSTRACT

A system, terminating node, method, and computer program product enable an originating node in a public network to communicate with a terminating node in a private network by sending a non-IP-based message from the originating node to the terminating node, thereby causing the terminating node to initiate IP-based communication with the originating node. Because a client behind a NAT and/or firewall in a private network will generally be able to connect and establish a TCP/IP session to a server in the public network, this improves the ability of the originating node to communicate with the terminating node whenever desired. Once the IP-based communication session is established, the two nodes can exchange data in both directions until the connection between them is closed by either node. As such, unmodified client and server TCP/IP applications are able to traverse a NAT/firewall, without the need for configuration of an intermediary node.

48 Claims, 4 Drawing Sheets

FOREIGN PATENT DOCUMENTS

JP     2001119676 A     4/2004

OTHER PUBLICATIONS

Office Action dated Mar. 12, 2010 of corresponding Korean Patent Application No. 10-2008-7001761.

Office Action dated Nov. 2, 2010 (with English translation) of corresponding Chinese Patent Application No. 200680027052.1.

English translation of Office Action dated Jun. 7, 2010 of corresponding Japanese Patent Application No. 2008-517619.

Office Action dated Jun. 7, 2010 of corresponding Japanese Patent Application No. 2008-517619.

The State Intellectual Property Office of the People's Republic of China, Office Action for Chinese Application No. CN200680027052.1, dated Mar. 19, 2012.

* cited by examiner

FIG. 2.
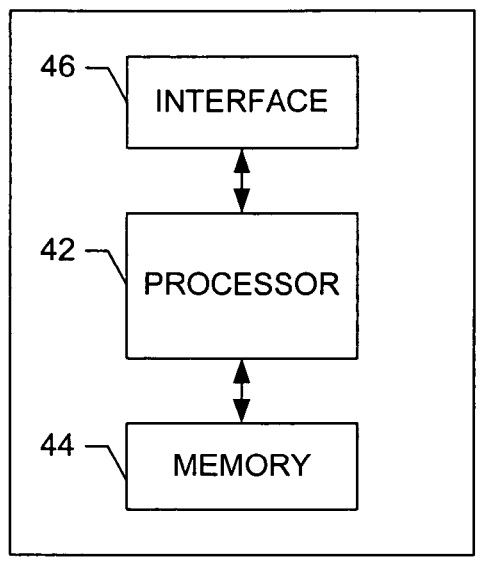
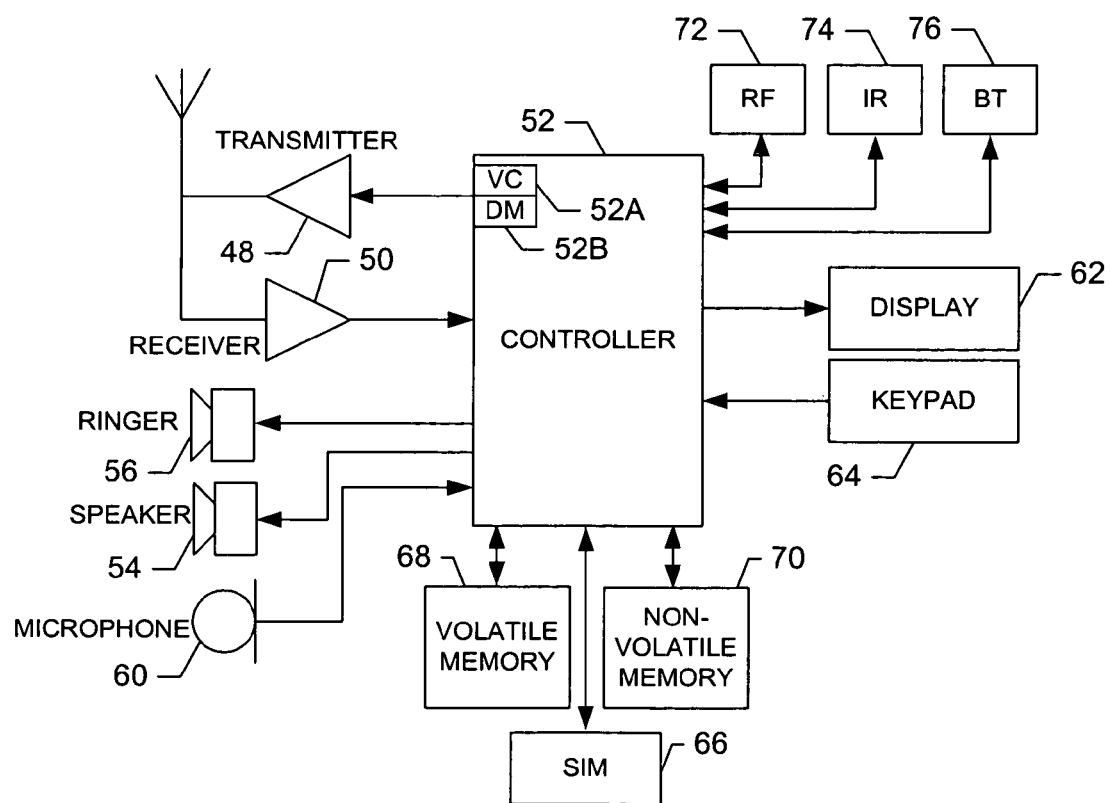
FIG. 3.

SYSTEM, TERMINAL, METHOD, AND COMPUTER PROGRAM PRODUCT FOR ESTABLISHING A TRANSPORT-LEVEL CONNECTION WITH A SERVER LOCATED BEHIND A NETWORK ADDRESS TRANSLATOR AND/OR FIREWALL

FIELD OF THE INVENTION

Embodiments of the invention generally relate to systems and methods for communicating in accordance with Internet Protocol (IP) and, more particularly, to systems and methods for establishing an IP connection with a terminating network node.

BACKGROUND OF THE INVENTION

One of the limitations of various versions of the Internet Protocol (IP) such as IPv4, is that it has a limited address space. Consequently, in order to conserve addresses, enterprises and other administrative domains have resorted to using private addresses. Private addresses are network addresses in which the IP address falls within the ranges of 10.0.0.0-10.255.255.255, 172.16.0.0-172.31.255.255, or 192.168.0.0-192.168.255.255.

Private addresses that are assigned by an administrative entity within a private network only have relevance within the respective private network. Accordingly, such private addresses are typically not visible outside the private network. An advantage of using private addresses, however, is that different private networks may assign the same private IP address to hosts within their respective private networks without any concern of conflict. On the other hand, a Network Address Translator (NAT), which can also function as Network Address Port Translator (NAPT), can be used when a host that is assigned a private address within a private network intends to send an IP datagram to a host that is outside the private network of the sending host. A NAT transforms a private IP address (and possibly other selected fields within the datagram) into a public IP address prior to the IP datagram being sent outside the private network associated with the NAT. With the added functionality of the NAPT, the NAT can further transform ports, such as Transmission Control Protocol (TCP) or User Datagram Protocol (UDP) ports, from the private network to the public network. Similarly, when an IP datagram is sent from a host that is outside the administrative domain associated with the NAT to a host with a private address, then the NAT transforms a public IP address to a private IP address and, with the NAPT added functionality, a port in the public network to a port in the private network.

In addition to providing address and port translations, the NAT can communicate with a firewall and/or gateway that operate as a security mechanism to an associated private network. In this regard, the firewall/gateway can operate to provide security in that, as before incoming datagrams pass through a translation process of the NAT and/or after outgoing datagrams pass through a translation process of the NAT, the firewall/gateway can be capable of qualifying such datagrams. In addition, by translating private IP addresses into public IP addresses, the NAT can be capable of providing a measure of privacy for those associated with the private IP addresses.

The use of private addresses within a private network and use of a NAT at the edge of a private network has been widely adopted and deployed within enterprises. There are, however, drawbacks associated with use of a NAT. In this regard, consider a private network comprising, connected to or otherwise associated with a mobile network, such as a general packet radio service (GPRS) network. In such instances, a terminating node, such as a mobile terminal, communicating across the mobile network can generally initiate a packet-switched (e.g., IP) connection with an IP device across the NAT. An IP device typically cannot, however, initiate a similar packet-switched connection with the terminating node across the NAT. In addition, because terminating nodes typically lack a static and public identity like a fixed IP-address, IP devices often cannot identify a desired terminating node to the NAT.

Mobile networks are typically configured in a manner that prevents an IP device from initiating a packet-switched connection with a respective terminating node for a number of reasons. Firstly, depending upon the mobile network topology, enabling IP-connectivity to terminating nodes within the mobile network can consume an undesirable amount of resources or reduce performance of the mobile network even when there is no IP traffic across the mobile network. Secondly, in the mobile network, as in many private networks, there may be more terminating nodes than available IP addresses. As such, the mobile network may include a NAT, dynamically allocated IP addresses and/or private IP addresses. Thirdly, the security needs and policies of many mobile networks require that various IP traffic be prevented from passing into the mobile network. Such an instance also often leads to the use of the NAT, particularly when the mobile networks include an associated firewall/gateway.

Typically, clients that use the TCP/IP protocol suite and are located in a private network are able to contact and connect to servers that use the TCP/IP protocol suite that are located in the public network. Connectivity in the opposite direction, i.e., clients in a public network connecting to servers in a private network, is usually much more complicated and often not possible for two reasons: (1) because nodes in the private network have private, non-routable IP addresses that are meaningless to clients outside the private network and cannot be used by the clients, and (2) because firewalls are often configured to block all such connections for security reasons.

Several solutions have been proposed to address this NAT/firewall traversal problem. In one solution, a node acting as a NAT/firewall exposes a port associated with the node's own public IP address and incoming connections to this port are translated and relayed as incoming connections to the desired server. Additionally, many systems offer solutions using intermediary nodes, such as agents, proxies, application gateways, virtual private network (VPN) gateways, and the like. These solutions depend on configuring one or more intermediary nodes (e.g. NAT, firewall, VPN gateway, application gateway, etc.) located between the client and the server to mediate so that the connection between the two nodes is successful. Even though these solutions enable NAT/firewall traversal, there are drawbacks in requiring an intermediary node to assist the connection between the client and the server. For example, generally operators and/or administrators, rather than users, control these intermediary nodes, resulting in little or no control by the users. Also, network administrators or users would have to reconfigure NATs/firewalls often to enable communications as new servers are added to the private network. Thus, it would be desirable to have a system and method that would enable NAT/firewall traversal without requiring special configurations of intermediate network nodes and without requiring any modifications in existing client and server TCP/IP applications in the end nodes.

BRIEF SUMMARY OF THE INVENTION

A system, terminating node, method, and computer program product are therefore provided that enable an originating node in a public network to communicate with a terminating node in a private network by sending a non-IP-based message from the originating node to the terminating node, thereby causing the terminating node to initiate IP-based communication with the originating node. Because a client behind a NAT and/or firewall in a private network will generally be able to connect and establish a TCP/IP session to a server in the public network, this improves the ability of the originating node to communicate with the terminating node whenever desired. Once the IP-based communication session is established, the two nodes can exchange data in both directions until the connection between them is closed by either node.

In this regard, a system for establishing an Internet Protocol (IP) connection with a terminating node comprises an originating node and a terminating node. The terminating node may be capable of receiving a communication request from the originating node via a non-IP-based communication technique, and initiating IP-based communication with the originating node in response to the communication request. The originating node may select the non-IP-based communication technique from the group comprising oral communication, telephony, text messaging, radio frequency (RF) communication, short messaging service (SMS) communication, multimedia messaging service (MMS) communication, and instant messaging. The communication request may define an internet protocol (IP) address and a port number of a socket at the originating node. The terminating node may be further capable of verifying a validity of the communication request using security information defined by the communication request.

In one embodiment, the terminating node further comprises an application layer, a middleware layer, and a system layer, and the originating node comprises an application layer, a middleware layer, and a system layer. The terminating node may be further capable of creating a virtual server socket between the application layer at the terminating node and the middleware layer at the terminating node. The originating node may be further capable of creating a virtual client socket between the application layer at the originating node and the middleware layer at the originating node. The originating node may be further capable of sending the communication request from the middleware layer at the originating node to the middleware layer at the terminating node via the non-IP-based communication technique. The terminating node may be further capable of creating a client socket between the middleware layer at the terminating node and the system layer at the terminating node. The originating node may be further capable of creating a server socket between the middleware layer at the originating node and the system layer at the originating node. The terminating node may be further capable of receiving the communication request at the middleware layer of the terminating node, the communication request defining an internet protocol (IP) address and a port number of the server socket at the originating node.

In one embodiment, the terminating node may be further capable of receiving a connect-successful message by the client socket at the terminating node, converting the connect-successful message by the middleware at the terminating node to an accept-successful message, and receiving the accept-successful message at the virtual socket at the terminating node. The originating node may be further capable of receiving an accept-successful message by the server socket at the originating node, converting the accept-successful message by the middleware at the originating node to a connect-successful message, and receiving the connect-successful message at the virtual socket at the originating node.

The originating node may be located in a public network and the terminating node may be located in a private network. In one embodiment, the private network has at least one of a firewall and a network address translator.

In addition to the system for establishing an IP connection as described above, other aspects of the invention are directed to corresponding terminating nodes, originating nodes, methods, and computer program products for system for establishing an IP connection.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is a schematic block diagram of an entity capable of operating as a network node, according to embodiments of the invention;

FIG. 3 is a schematic block diagram of a mobile station that may operate as a mobile terminal, according to embodiments of the invention;

DETAILED DESCRIPTION OF THE INVENTION

Exemplary embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. While exemplary embodiments of the invention are described primarily in terms of facilitating communication using TCP, embodiments of the invention may be used to facilitate communication using other transport protocols, such as UDP.

Figure 1:
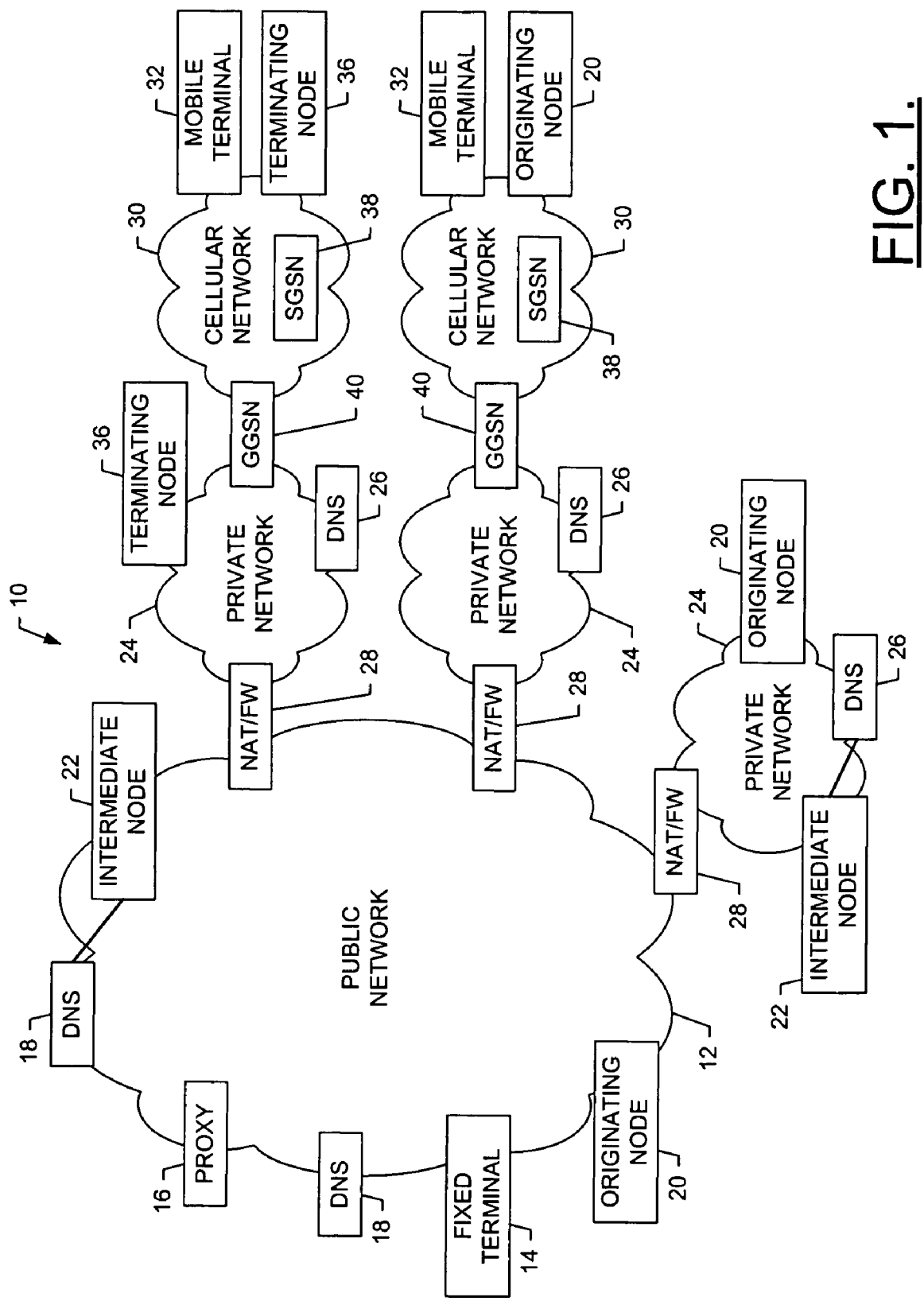
FIG. 1 is a schematic block diagram of a communications system that would benefit from embodiments of the invention including at least one mobile network and at least one public and/or private network to which an originating node, an intermediate node and a terminating node are bi-directionally coupled directly or indirectly.

Referring to FIG. 1, an illustration of one type of system that would benefit from embodiments of the present invention is provided. The system and method of embodiments of the present invention will be primarily described in conjunction with mobile communications applications. It should be understood, however, that the system and method of embodiments of the invention can be utilized in conjunction with a variety of other applications, both in the mobile communications industries and outside of the mobile communications industries.

As shown, the system 10 includes a public network 12, such as a public Internet Protocol (IP) network like the Internet. The public network includes a number of network nodes, each of which typically comprise a processing element such as a server computer, personal computer, laptop computer or the like. More particularly, the public network can include one or more network nodes comprising fixed terminals 14, each of which are capable of communicating within or across the public network. The network nodes of the public network 12 can also include a proxy 16, such as Session Initiation Protocol (SIP) proxy. As will be appreciated, the SIP proxy is capable of receiving and forwarding SIP signaling messages, such as SIP signaling messages to and/or from a network node comprising a fixed terminal operating as a SIP client.

In addition, the public network 12 can include one or more domain name system (DNS) servers 18. In this regard, each network node typically has a unique IP address that has an associated, typically easier to recall, host DNS name. The DNS servers, then, can be capable of transforming a host DNS name into the associated IP address such that network traffic can be routed to the appropriate network node. As described in greater detail below, any one or more of the network nodes, including any one or more fixed terminals, can operate as an originating node 20 to communicate with a terminating node across the public network. And to facilitate the originating node in communicating with the terminating node, the public network can further include one or more network nodes comprising an intermediate node 22, also described in greater detail below.

In addition to the public network 12, the system 10 includes one or more private networks 24, such as local area networks (LANs). Each private network, like the public network, can include a number of network nodes. Also, like the public network 12, the network nodes of each private network can include one or more DNS servers 26. Similar to before, the DNS servers of the private networks can be capable of transforming a host DNS name into an associated IP address such that network traffic can be routed to the appropriate public or network node. The private network can also include one or more network nodes comprising mobile terminals 32, each of which are capable of communicating within or across the private network. The terminals 32 can comprise, for example, mobile telephones, portable digital assistants (PDAs), pagers, laptop computers, smart cards and other types of electronic systems. In addition to mobile terminals, the private network may also include fixed terminals, such as personal computers.

To facilitate the terminals 32 accessing the private network, the private network 24 can include one or more wireless access points (AP's) (not shown), each of which can be coupled to one or more terminals. In this regard, the AP's can comprise access points configured to communicate with the terminal in accordance techniques such as, for example, radio frequency (RF), Bluetooth (BT), infrared (IrDA) or any of a number of different wireless networking techniques, including wireless local area network (WLAN) or other techniques, including wireline techniques. Also, like the public network, the private network can include an originating node 20 and/or an intermediate node 22, both of which are described in greater detail below. As also described below, the private network can include a terminating node 36, which can be capable of communicating with an originating node via an intermediate node. And as also described below, one or more of the terminals of the private network can be capable of operating as an originating node or an intermediate node.

To facilitate communications between network nodes of the public network 12 and network nodes of the private networks 24, each private network can further include a Network Address Translator (NAT) interconnecting the public network and the private network. As explained above in the background section, each NAT can be capable of transforming a public IP address from the public network into a private IP address of a network node of a respective private network, and vice versa, for communications between the public network and the respective private network. As will be appreciated, the NAT can also include an application level gateway (ALG) (not shown) capable of transforming IP addresses embedded in, for example, application protocol data units (PDUs). In addition, the NAT may include or be associated with a firewall and/or gateway for the respective private network. As shown, then, a NAT including or associated with a firewall/gateway is shown as a NAT/FW 28.

The system 10 can also include one or more mobile or cellular networks 30. The cellular networks can comprise one or more of a number of different mobile networks. In this regard, the cellular networks can comprise any of a number of first-generation (1G), second-generation (2G), 2.5G and/or third-generation (3G) cellular networks, and/or any of a number of other cellular networks capable of operating in accordance with embodiments of the present invention. For example, each cellular network can comprise a GSM (Global System for Mobile Communication), IS-136 (Time Domain Multiple Access—TDMA), IS-95 (Code Division Multiple Access—CDMA), CDMA200, or EDGE (Enhanced Data GSM Environment) network. Alternatively, one or more of the cellular networks can comprise GPRS (General Radio Packet Service) or GPRS-based (e.g., Universal Mobile Telecommunications System—UMTS) networks.

Like the public and private networks 12, 24, the cellular networks 30 also include one or more network nodes. In this regard, the network nodes of each cellular network can include one or more mobile terminals 32 capable of communicating within and/or across a respective cellular network. And as described below, one or more of the mobile terminals are capable of operating as an originating node 20, such as in the same manner as the originating nodes of the public and private networks. In addition, as also described below, one or more of the mobile terminals are capable of operating as a terminating node 36 which, as indicated above and described below, can be capable of communicating with an originating node via an intermediate node 22. While the originating and terminating nodes are generally described as mobile terminals herein, the originating and terminating nodes may be fixed terminals in other embodiments.

Within the cellular networks 30, the network nodes can also include one or more network signaling support nodes such as one or more SGSNs (signaling GPRS support nodes) 38, and one or more gateway support nodes such as one or more GGSNs (gateway GPRS support nodes) 40. For example, the network nodes can include one or more SGSNs and one or more GGSNs, as such are described in a number of specifications of the 3G Partnership Project (3GPP). As will be appreciated by those skilled in the art, the SGSNs are capable of routing communications to and from the mobile terminals 32, and can also provide a connection to the other network nodes when the terminals are involved in a communication session with such network nodes. The GGSNs, on the other hand, are capable of interconnecting the cellular networks and the private networks 24. In this regard, the GGSNs are capable of performing traditional gateway actions, as such are well known. It should be noted that although the cellular networks can include SGSNs and GGSNs, the cellular networks can comprise other similarly operating network nodes for other types of cellular networks.

Reference is now made to FIG. 2, which illustrates a block diagram of an entity capable of operating as a network node (e.g., originating node 20, intermediate node 22, NAT/FW 28, terminating node 36, SGSN 38, GGSN 40, etc.) within the public network 12, private networks 24 or cellular networks 30, in accordance with one embodiment of the present invention. Although shown as separate entities, in some embodiments, one or more entities may support one or more of the network nodes, logically separated but co-located within the entit(ies). For example, a single entity may support a logically separate, but co-located, originating node (e.g., fixed terminal 14, proxy 16, DNS 18, mobile terminal 32, etc.) and intermediate node. Also, for example, as indicated above, a single entity may support a logically separate, but co-located NAT and firewall/gateway.

The entity capable of operating as a network node includes various means for performing one or more functions in accordance with exemplary embodiments of the invention, including those more particularly shown and described herein. It should be understood, however, that one or more of the entities may include alternative means for performing one or more like functions, without departing from the spirit and scope of the present invention. More particularly, for example, as shown in FIG. 2, the entity can generally include means, such as a controller 42, processor or the like, connected to a memory 44 for controlling the various functions of the entity. The controller can also be connected to at least one interface 46 or other means for transmitting and/or receiving data, content or the like. The memory can comprise volatile and/or non-volatile memory, and typically stores content, data or the like. For example, the memory typically stores software applications, instructions or the like for the controller to perform steps associated with operation of the entity in accordance with embodiments of the present invention. Also, for example, the memory typically stores content transmitted from, or received by, the network node.

FIG. 3 illustrates a functional diagram of a mobile station that may operate as a mobile terminal 32 and, as such, an originating node 20 or terminating node 36, according to embodiments of the invention. It should be understood, that the mobile station illustrated and hereinafter described is merely illustrative of one type of mobile terminal that would benefit from the present invention and, therefore, should not be taken to limit the scope of the present invention. While several embodiments of the mobile station are illustrated and will be hereinafter described for purposes of example, other types of mobile terminals, such as portable digital assistants (PDAs), pagers, laptop computers and other types of voice and text communications systems, can readily employ embodiments of the present invention. Additionally, fixed terminals, such as personal computers, may, instead, serve as the originating node and/or the terminating node in other embodiments.

The mobile station includes various means for performing one or more functions in accordance with exemplary embodiments of the present invention, including those more particularly shown and described herein. It should be understood, however, that the mobile station may include alternative means for performing one or more like functions, without departing from the spirit and scope of the present invention. More particularly, for example, as shown in FIG. 3, the mobile station includes a transmitter 48, a receiver 50, and means, such as a controller 52, that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of 1G, 2G, 2.5G and/or 3G communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 52 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 52A, and may include an internal data modem (DM) 52B. Further, the controller may include the functionally to operate one or more software applications, which may be stored in memory.

The mobile station also comprises a user interface including a conventional earphone or speaker 54, a ringer 56, a microphone 60, a display 62, and a user input interface, all of which are coupled to the controller 52. The user input interface, which allows the mobile station to receive data, can comprise any of a number of devices allowing the mobile station to receive data, such as a keypad 64, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 66, a removable user identity module (R-UIM) or the like, which typically stores information elements related to a mobile subscriber. In addition to the SIM, the mobile station can include other memory. In this regard, the mobile station can include volatile memory 68, as well as other non-volatile memory 70, which can be embedded and/or may be removable. For example, the other non-volatile memory can comprise embedded or removable multimedia memory cards (MMCs), Memory Sticks manufactured by Sony Corporation, EEPROM, flash memory, hard disk or the like. The memories can store any of a number of pieces of information, and data, used by the mobile station to implement the functions of the mobile station. For example, the memories can store an identifier, such as an international mobile equipment identification (IMEI) code, international mobile subscriber identification (IMSI) code, mobile station integrated services digital network (MSISDN) code or the like, capable of uniquely identifying the mobile station. The memories can also store content, such as that to transmit to, or that received from, an originating node 20.

The mobile station can also include one or more means for sharing and/or obtaining data from electronic devices, such as other network nodes, in accordance with any of a number of different wireline and/or wireless techniques. For example, the mobile station can include a radio frequency (RF) transceiver 72 and/or an infrared (IR) transceiver 74 such that the mobile station can share and/or obtain data in accordance with radio frequency and/or infrared techniques. Also, for example, the mobile station can include a Bluetooth (BT) transceiver 76 such that the mobile station can share and/or obtain data in accordance with Bluetooth transfer techniques. Although not shown, the mobile station may additionally or alternatively be capable of transmitting and/or receiving data from electronic devices according to a number of different wireline and/or wireless networking techniques, including local area network (LAN) and/or wireless LAN (WLAN) and/or other wireless techniques.

As indicated in the background section, conventional techniques for permitting an IP device, such as an originating node 20, to initiate an IP connection with a terminating node 36, such as a mobile terminal, ignore the limitations of the public domains like the public network 12 (e.g., Internet) that lead to the use of the NAT/FW 28 to interconnect the public network to a respective private network 24. Namely, such techniques ignore the limitation of available public IP addresses. Thus, embodiments of the present invention provide an improved system and method for communicating with a terminating node, where the terminating node resides in a private network, such as a cellular or otherwise mobile network. More particularly, embodiments of the invention provide a system, terminating node, method, and computer program product that enable an originating node in a public network to communicate with a terminating node in a private network by sending a non-IP-based message from the originating node to the terminating node, thereby causing the terminating node to initiate IP-based communication with the originating node. In this regard, the originating node (i.e., a client) functions like a server in that the originating node waits for the terminating node to initiate a transport level connection. Similarly, the terminating node (i.e., a server) functions like a client in that the terminating node, in response to the non-IP-based message, initiates a transport level connection with the originating node.

A number of frameworks have been proposed which provide a "virtual socket" interface to TCP/IP client and server applications, either transparently through the use of a regular (e.g., Berkley) socket application program interface (API) or through the use of a virtual socket API. The use of these virtual sockets by the TCP/IP applications is similar or even identical to the use of the regular socket API (i.e., the virtual sockets may be transparent to the TCP/IP applications). These virtual sockets, however, beyond offering an API to create end-to-end connections using the TCP/IP protocol stack, also offer a number of enhancement services in support of the end-to-end TCP/IP sessions. For example, an "end-to-end session support" (e2e-SS) service offers end-to-end mobility support and support against disconnections at the TCP socket-level. Examples of such e2e-SS services include MobileSocket (see, e.g., T. Okoshi, M. Mochizuki, Y. Tobe, and H. Tokuda, *MobileSocket: Towards Continuous Operation for Java Applications*, IEEE Int'l Conf. on Computer Comm'ns and Networks (ICCCN), 1999), ROCKS/RACKS (see, e.g., V. Zandy and B. Miller, *Reliable Network Connections*, ACM MOBICOM, September 2002), Mobile TCP Sockets (see, e.g., X. Qu, J. Xu Yu, and R. Brent, *A Mobile TCP Socket*, Int'l Conf. on Software Engineering (SE), November 1997), and Migrate (see, e.g., A. Snoeren, *A Session-Based Architecture for Internet Mobility*, Ph.D. Thesis, MIT, February 2003).

These frameworks can be characterized as communications middleware, because they provide support by interposing themselves between the applications and the native system networking support of the end (i.e., originating and terminating) nodes to assist communications between application layers of different end nodes, whether performed entirely by or at the end node or, possibly, by a proxy acting with an end node. Such middleware is typically able to create, modify, and destroy actual network sockets as needed using the regular socket API. This creation, modification, and destruction is transparent to the TCP/IP applications, which only see the virtual sockets that have been created between the application and the middleware. One property of these frameworks is that such frameworks do not require support from the infrastructure or any intermediate nodes, but only require the two end nodes to collaborate. Exemplary embodiments of the invention leverage such frameworks to enable a client and a server to collaborate to address the NAT/firewall traversal problem, typically without modifications to the applications or special configurations to any intermediate nodes.

Middleware may provide TCP/IP applications with a virtual socket interface though which the application can communicate. Using a virtual socket allows the actual network sockets to be destroyed and replaced as may occur and as may be necessary such as to deal with IP address changes, disconnections, and TCP expirations. A virtual socket isolates the TCP/IP application from what is happening at the network (i.e., system) layer. Thus, instead of an application opening an actual (real) networking socket, the application opens a socket to the middleware which is a virtual networking socket between the application and the middleware layers, and the middleware opens an actual networking socket with the network (system) layer. As such, the middleware may create and destroy actual network connections without affecting the application, therefore isolating the application layer from the network layer. As discussed above, the virtual socket may be transparent to the application, such that it appears to the TCP/IP application that the application is communicating with an actual socket rather than a virtual socket. In some approaches, the application may be aware of the virtual socket and that the middleware is controlling the communications for the application. Middleware permits the end node to monitor and support the actual communication connection for disconnections and other infirmities and protect the applications of the application layer from the problems related to the communication connection such as problems related to TCP connections in the mobile environment. Middleware typically does not require any support from infrastructure or intermediate nodes. Rather, middleware resides in each of the end nodes to allow the end nodes to collaborate regarding the manner in which the middleware will function to support network communications for the applications. Essentially, the intelligence for supporting the communication is moved from infrastructure into the end nodes. Thus, middleware is a suitable solution for transport level connections including ad hoc scenarios and scenarios without infrastructure support.

Figure 4:
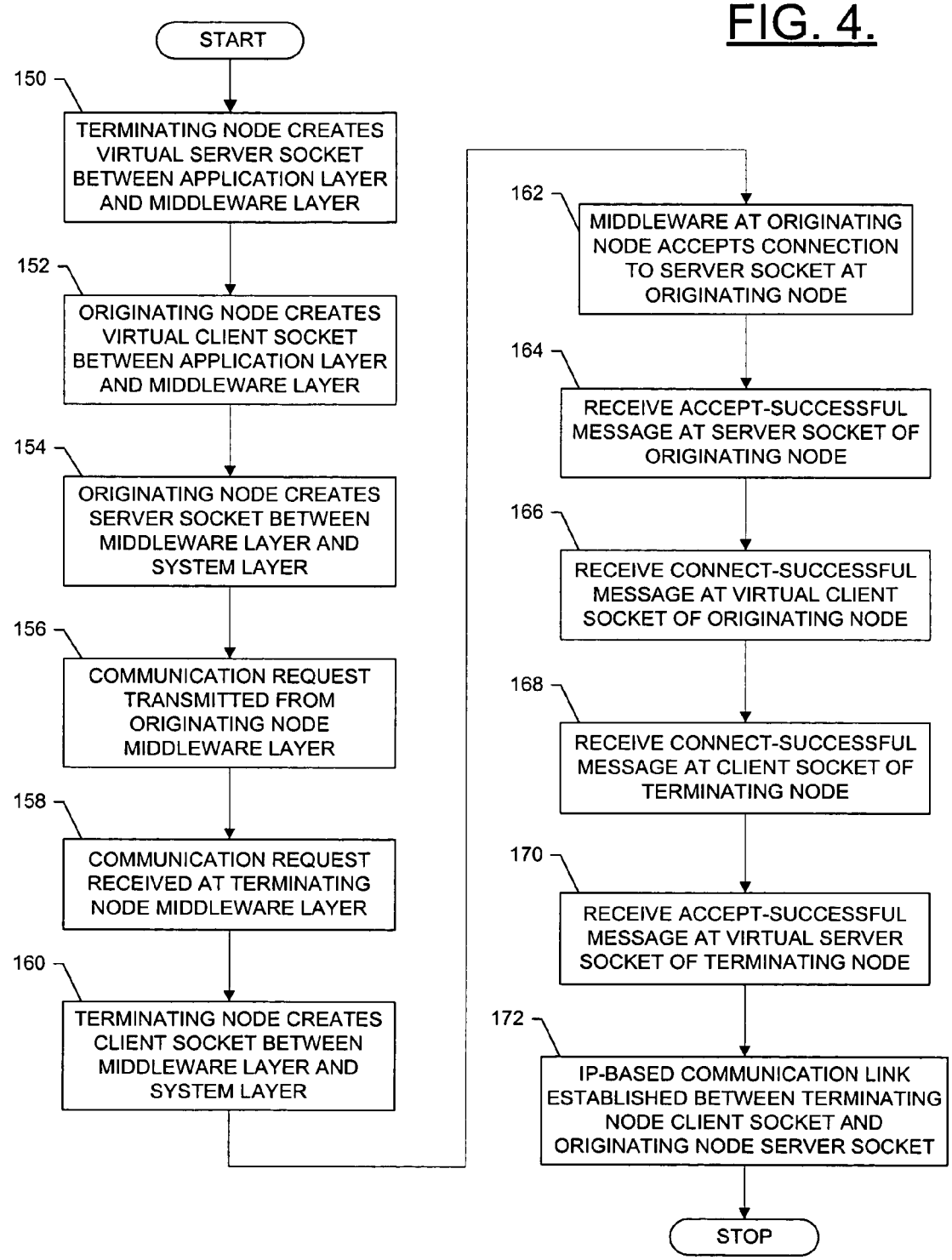
FIG. 4 is a flowchart of a method of establishing a transport-level connection with a server located behind a NAT and/or firewall, according to one exemplary embodiment of the invention.

Referring now to FIG. 4, a flowchart of a method of establishing a transport-level connection with a server located behind a NAT and/or firewall is illustrated, according to one exemplary embodiment of the invention. Embodiments of the invention use middleware to send a non-IP-based message from the originating node to the terminating node, thereby causing the terminating node to initiate IP-based communication with the originating node. A server located in a private network (i.e., a terminating node) may create a server socket (also termed a listening socket) to enable the server to receive communication requests, and in response the middleware will typically return to the server a virtual server socket. See block 150 of FIG. 4. When a client application of the host located in the public network (the "client-end" or the originating node) creates a socket (termed a client socket or connecting socket) to connect to the server application of the terminating node, the middleware will return to the client application a virtual client socket. See block 152. The middleware will also use the regular socket API to create an actual server socket (or listening socket) at the originating node. See block 154. The middleware will then use a non-IP-based (also termed out-of-band) communication mechanism (e.g., oral communication, telephony, text messaging, radio frequency (RF) communication, short messaging service (SMS) communication, multimedia messaging service (MMS) communication, instant messaging, ad-hoc network link, near-field communication (e.g., radio frequency identification), or infrared link) to send a message to the node with which the originating node desires to communicate (i.e., the terminating node located in a private network). See block 156. This non-IP-based message informs the terminating node that an originating node desires to establish a TCP/IP connection. This message will typically contain information that would identify the server socket (i.e., the listening socket) at the originating node, such as the IP address and port number of the listening socket, and any other parameters that may be needed to establish a TCP/IP connection, such as security information (e.g., password or public encryption key). Additionally, this message may be encrypted to further increase security. If the message is encrypted, the originating node and the terminating node would typically be preconfigured to share encryption keys to enable encryption/decryption of the message. To enable the originating node to send this non-IP-based message to the terminating node, the middleware at the originating node will typically contain information, such as a cross-reference table, to translate an IP-based identifier (e.g., IP address or DNS name) used by the client application into a non-IP-based identifier (e.g., telephone number, email address, IM screen name) that may be used to send the communication message to the terminating node via the corresponding non-IP-based communication method. The cross-reference table may, for example, contain a cross-reference between DNS names (that the client application may use to request a TCP/IP connection with a particular server) and corresponding mobile telephone numbers (that the middleware at the client may use to send an SMS message to the middleware at the particular server). This message may be received by middleware located in the terminating node. See block 158. Upon receiving this message, the middleware located in the terminating node will then typically create a client socket using the native socket API and connect to the server socket listening at the originating node. See block 160. Because this TCP/IP connection is being initiated by the node within the private network (i.e., the terminating node), the connection is more likely to succeed than if the TCP/IP connection had been initiated by the node within the public network (i.e., the originating node). The middleware at the originating node may then accept the connection to the server socket (typically after some security handshake). See block 162. The server socket at the originating node will typically receive an "accept-successful" message indicating that the server socket's acceptance of the connect request from the client socket was successful. See block 164. Because the client application has a (virtual) client socket open between the application layer and the middleware layer, the client socket is expecting to receive a "connect-successful" message. As such, the middleware would convert the accept-successful message received at the server socket into a connect-successful message which may then be received by the virtual client socket. See block 166. At or near the same time, the client socket at the terminating node will typically receive a "connect-successful" message indicating that the client socket's connect request to the server socket was successful. See block 168. Because the server application has a (virtual) server socket open between the application layer and the middleware layer, the server socket is expecting to receive an "accept-successful" message. As such, the middleware would typically convert the connect-successful message received at the client socket into an accept-successful message which may then be received by the virtual server socket. See block 170. Once this is done, the IP-based communication link is established and TCP/IP data can flow between the client and server application. See block 172. The connection will typically remain open until the connection is terminated by one of the nodes.

Figure 5:
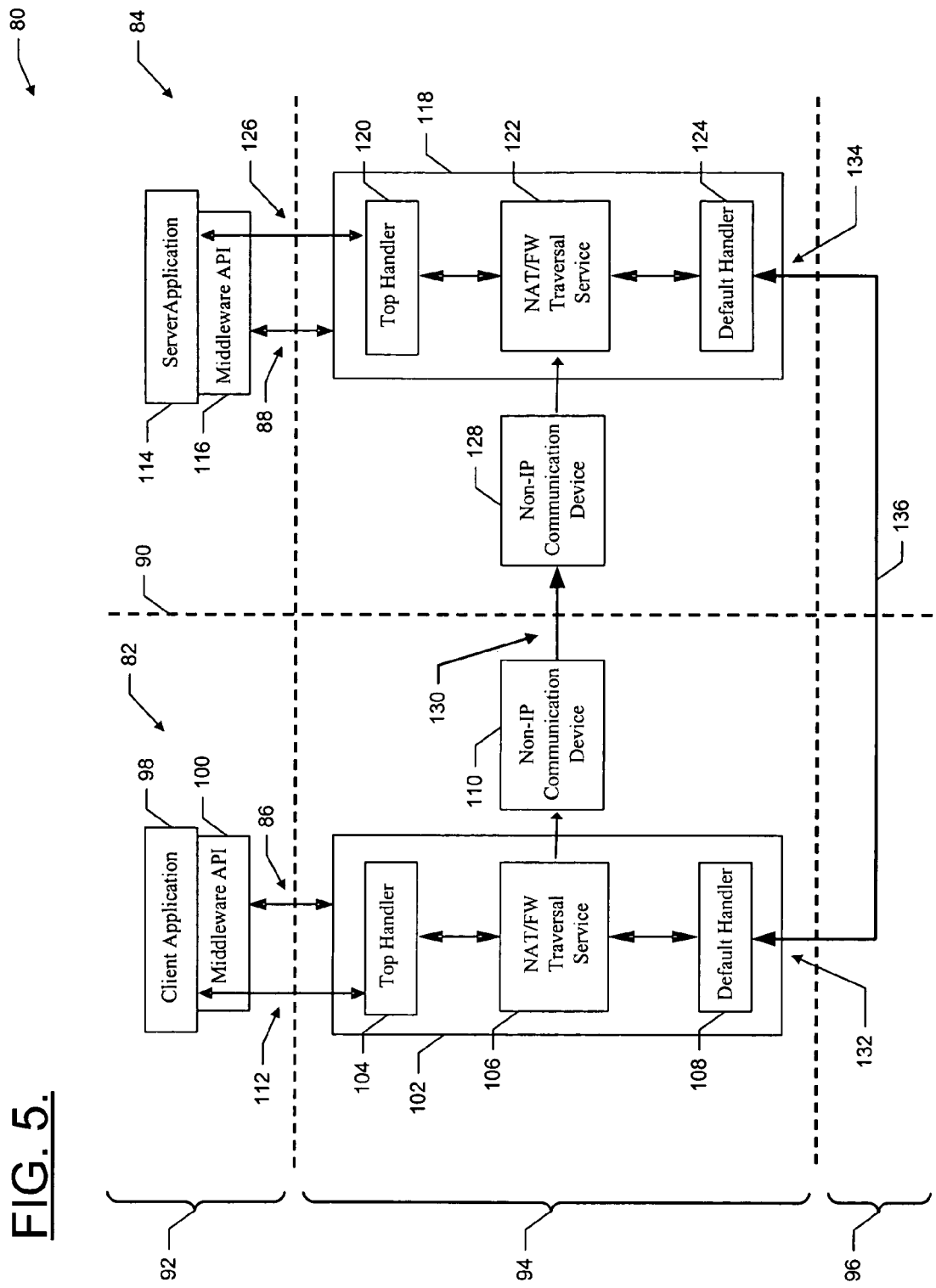
FIG. 5 is a functional block diagram of a system capable of establishing a transport-level connection with a server located behind a NAT and/or firewall, according to one exemplary embodiment of the invention.

Referring now to FIG. 5, a functional block diagram of a system capable of establishing a transport-level connection with a server located behind a NAT and/or firewall according to the method detailed in FIG. 4 and discussed above is illustrated, according to one exemplary embodiment of the invention. The system 80 of FIG. 5 comprises an originating node 82 within a public network 86 and a terminating node 84 within a private network. Terminating node 84 is located behind a NAT/firewall 90. It should be appreciated that NAT/firewall 90 may be either a NAT, a firewall, or both. Both originating node 82 and terminating node 84 comprise three layers: an application layer 92, a middleware layer 94, and a system layer 96. Within the application layer 92, the originating node comprises a client application 98 and a middleware API 100. The middleware API directs control signals 86 to coordinate the operation of the client application with the originating node middleware 102. Similarly within the application layer 92, the terminating node comprises a server application 114 and a middleware API 116. The middleware API directs control signals 88 to coordinate the operation of the server application with the terminating node middleware 118.

At both the originating node and the terminating node, the middleware 102, 118 may include a top handler 104, 120 to control the virtual socket communications with the application layer and a default handler 108, 124 to control the communications with the actual network socket communications with the network layer. As discussed above, virtual client socket 112 may be established between the client application 98 and the middleware 102, and actual server socket 132 may be established by the middleware 102, at the originating node. Additionally, virtual server socket 126 may be established between the server application 114 and the middleware 118 at the terminating node. The middleware 102 typically includes a NAT and/or firewall traversal service 106. Upon creation of the virtual client socket 112, the NAT and/or firewall traversal service may direct a non-IP communication device 110 to transmit a non-IP-based communication request message 130. As discussed above, the non-IP-based communication request message and the non-IP communication device 110 may utilize any number of different communication methods. The non-IP-based communication message 130 would typically be received at the terminating node by a corresponding non-IP communication device 128. Upon receipt of the non-IP-based communication message 130, the NAT and/or firewall traversal service 122 would typically create actual client socket 134. Typically after some handshaking, a transport level communication connection 136 would be established between client socket 134 and server socket 132.

According to one exemplary aspect of the invention, the functions performed by one or more of the entities of the system, such as the network node, may be performed by various means, such as hardware and/or firmware, including those described above, alone and/or under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In this regard, FIG. 4 is a flowchart of methods and program products according to the invention. It will be understood that each step of the flowchart, and combinations of steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising:
    an originating node; and
    a terminating node configured to receive a communication request from the originating node via a non-Internet Protocol (IP)-based communication technique, wherein the communication request is received via a non-IP-based connection with the terminating node, the terminating node further configured to initiate IP-based communication with the originating node to enable the originating node to receive IP data in response to the communication request, wherein the originating node is located in a public network and the terminating node is located in a private network.

2. The system of claim 1, wherein the originating node is configured to select the non-IP-based communication technique from the group comprising oral communication, telephony, text messaging, radio frequency (RF) communication, short messaging service (SMS) communication, multimedia messaging service (MMS) communication, and instant messaging.

3. The system of claim 1, wherein the communication request defines a non-IP-based identifier and a port number of a socket at the originating node.

4. The system of claim 1, wherein the terminating node is further configured to verify a validity of the communication request using security information defined by the communication request.

5. The system of claim 1, wherein the terminating node further comprises an application layer, a middleware layer, and a system layer; wherein the originating node comprises an application layer, a middleware layer, and a system layer; wherein the terminating node is further configured to create a virtual server socket between the application layer at the terminating node and the middleware layer at the terminating node;
    wherein the originating node is further configured to create a virtual client socket between the application layer at the originating node and the middleware layer at the originating node;
    wherein the originating node is further configured to direct sending of the communication request from the middleware layer at the originating node to the middleware layer at the terminating node via the non-IP-based communication technique;
    wherein the terminating node is further configured to create a client socket between the middleware layer at the terminating node and the system layer at the terminating node;
    wherein the originating node is further configured to create a server socket between the middleware layer at the originating node and the system layer at the originating node;
    wherein the terminating node is further configured to receive the communication request at the middleware layer of the terminating node, the communication request defining an IP address and a port number of the server socket at the originating node.

6. The system of claim 5, wherein the terminating node is further configured to receive a connect-successful message by the client socket at the terminating node, converting the connect-successful message by the middleware layer at the terminating node to an accept-successful message, and receiving the accept-successful message at the virtual socket at the terminating node; and
    wherein the originating node is further configured to receive an accept-successful message by the server socket at the originating node, converting the accept-successful message by the middleware layer at the originating node to a connect-successful message, and receiving the connect-successful message at the virtual socket at the originating node.

7. The system of claim 1, wherein the private network comprises at least one of a firewall and a network address translator.

8. The system of claim 1, wherein the originating node is further configured to translate an IP-based identifier of the terminating node into a non-IP-based identifier of the terminating node; and wherein the originating node is further configured to use the non-IP-based identifier to send the communication request to the terminating node via the non-IP-based communication technique.

9. The system of claim 1, wherein the communication request is free from inclusion of an IP address.

10. The system of claim 1, wherein the terminating node is configured to initiate the IP-based communication by establishing an IP-based communication link between the terminating node and the originating node to enable the receipt of the IP data.

11. An apparatus comprising:
   at least one processor; and
   at least one memory including computer program code, the at least one memory and the computer program code configured to, with the at least one processor, cause the apparatus to perform at least the following:
      receive a communication request from an originating node via a non-Internet Protocol (IP)-based communication technique, the communication request is received via a non-IP-based connection with the apparatus; and
      facilitate initiation of an IP-based communication with the originating node to enable the originating node to receive IP data in response to the communication request, wherein the originating node is located in a public network and the apparatus is located in a private network.

12. The apparatus of claim 11, wherein the non-IP-based communication technique is selected from the group comprising oral communication, telephony, text messaging, radio frequency (RF) communication, short messaging service (SMS) communication, multimedia messaging service (MMS) communication, and instant messaging.

13. The apparatus of claim 11, wherein the communication request defines a non-IP-based identifier and a port number of a socket at the originating node.

14. The apparatus of claim 11, wherein the computer program code is configured to cause the apparatus to verify a validity of the communication request using security information defined by the communication request.

15. The apparatus of claim 11, further comprising an application layer, a middleware layer, and a system layer, wherein the computer program code is configured to cause the apparatus to:
   create a virtual server socket between the application layer and the middleware layer;
   receive the communication request at the middleware layer, the communication request defining an IP address and a port number of a server socket at the originating node; and
   create a client socket between the middleware layer and the system layer.

16. The apparatus of claim 15, wherein the computer program code is further configured to cause the apparatus to:
   receive a connect-successful message at the client socket;
   convert the connect-successful message by the middleware layer to an accept-successful message; and
   receive the accept-successful message at the virtual socket.

17. The apparatus of claim 11, wherein the private network comprises at least one of a firewall and a network address translator.

18. The apparatus of claim 11, wherein the communication request is free from inclusion of an IP address.

19. The apparatus of claim 11, wherein the computer program product is configured to cause the apparatus to facilitate the initiation of the IP-based communication by establishing an IP based communication link between the terminating node and the originating node to enable the receipt of the IP data.

20. An apparatus comprising:
   at least one processor; and
   at least one memory including computer program code, the at least one memory and the computer program code configured to, with the at least one processor, cause the apparatus to perform at least the following:
      direct sending of a communication request to a terminating node via a non-Internet Protocol (IP)-based communication technique, such that the terminating node is configured to direct initiation of IP-based communication with the apparatus to enable the apparatus to receive IP data in response to the communication request, the communication request is sent via a non-IP-based connection with the terminating node, wherein the apparatus is located in a public network and the terminating node is located in a private network.

21. The apparatus of claim 20, wherein the computer program code is configured to cause the apparatus to select the non-IP-based communication technique from the group comprising oral communication, telephony, text messaging, radio frequency (RF) communication, short messaging service (SMS) communication, multimedia messaging service (MMS) communication, and instant messaging.

22. The apparatus of claim 20, wherein the communication request defines a non-IP-based identifier and a port number of a socket at the apparatus.

23. The apparatus of claim 20, wherein the communication request defines security information, such that the terminating node is configured to verify a validity of the communication request using the security information.

24. The apparatus of claim 20, further comprising an application layer, a middleware layer, and a system layer, wherein the computer program code is further configured to cause the apparatus to:
   create a virtual client socket between the application layer and the middleware layer;
   direct sending of the communication request from the middleware layer via the non-IP-based communication technique; and
   create a server socket between the middleware layer and the system layer, wherein the communication request defines an IP address and a port number of the server socket.

25. The apparatus of claim 24, wherein the computer program code is further configured to cause the apparatus to:
   receive an accept-successful message by the server socket;
   convert the accept-successful message by the middleware layer to a connect-successful message; and
   receive the connect-successful message at the virtual socket.

26. The apparatus of claim 20, wherein the private network comprises at least one of a firewall and a network address translator.

27. The apparatus of claim 20, wherein the computer program code is further configured to cause the apparatus to:
   translate an IP-based identifier of the terminating node into a non-IP-based identifier of the terminating node; and
   use the non-IP-based identifier to send the communication request to the terminating node via the non-IP-based communication technique.

28. The apparatus of claim 20, wherein the communication request is free from inclusion of an IP address.

29. The apparatus of claim 20, wherein direct the sending of the communication request to the terminating node enables the terminating node to direct the initiation of the IP-based communication by establishing an IP-based communication link between the terminating node and the originating node to enable the receipt of the IP data.

30. A method comprising:
   receiving a communication request at a terminating node from an originating node via a non-Internet Protocol (IP)-based communication technique, the communication request is received via a non-IP-based connection with the terminating node; and initiating IP-based communication with the originating node by the terminating node to enable the originating node to receive IP data in response to the communication request, wherein the originating node is located in a public network and the terminating node is located in a private network.

31. The method of claim 30, wherein the non-IP-based communication technique is selected from the group comprising oral communication, telephony, text messaging, radio frequency (RF) communication, short messaging service (SMS) communication, multimedia messaging service (MMS) communication, and instant messaging.

32. The method of claim 30, wherein the communication request defines a non-IP-based identifier and a port number of a socket at the originating node.

33. The method of claim 30, further comprising:
verifying at the terminating node a validity of the communication request using security information defined by the communication request.

34. The method of claim 30, further comprising:
creating a virtual server socket between an application layer at the terminating node and a middleware layer at the terminating node;
creating a virtual client socket between an application layer at the originating node and a middleware layer at the originating node;
directing sending of the communication request from the middleware layer at the originating node to the middleware layer at the terminating node via the non-IP-based communication technique;
creating a client socket between the middleware layer at the terminating node and a system layer at the terminating node; and
creating a server socket between the middleware layer at the originating node and a system layer at the originating node;
wherein the communication request is received at the terminating node by the middleware layer; wherein the communication request defines an IP address and a port number of the server socket at the originating node; and wherein the IP-based communication is initiated by the middleware layer at the terminating node.

35. The method of claim 34, further comprising:
receiving a connect-successful message by the client socket at the terminating node;
converting the connect-successful message by the middleware layer at the terminating node to an accept-successful message;
receiving the accept-successful message at the virtual socket at the terminating node;
receiving an accept-successful message by the server socket at the originating node;
converting the accept-successful message by the middleware layer at the originating node to a connect-successful message; and
receiving the connect-successful message at the virtual socket at the originating node.

36. The method of claim 30, wherein the private network comprises at least one of a firewall and a network address translator.

37. The method of claim 30, further comprising:
translating by the originating node an IP-based identifier of the terminating node into a non-IP-based identifier of the terminating node, wherein the non-IP-based identifier is used to send the communication request to the terminating node via the non-IP-based communication technique.

38. The method of claim 30, wherein the communication request is free from inclusion of an IP address.

39. The method of claim 30, wherein initiating the IP-based communication further comprises establishing an IP-based communication link between the terminating node and the originating node to enable the receipt of the IP data.

40. A computer program product comprising at least one non-transitory computer-readable storage medium having computer-readable program code portions stored therein, the computer-readable program code portions comprising:
a first executable portion configured to receive a communication request at a terminating node from an originating node via a non-Internet Protocol (IP)-based communication technique, the communication request is received via a non-IP-based connection with the terminating node; and
a second executable portion configured to direct initiation of IP-based communication with the originating node by the terminating node to enable the originating node to receive IP data in response to the communication request, wherein the originating node is located in a public network and the terminating node is located in a private network.

41. The computer program product of claim 40, wherein the non-IP-based communication technique is selected from the group comprising oral communication, telephony, text messaging, radio frequency (RF) communication, short messaging service (SMS) communication, multimedia messaging service (MMS) communication, and instant messaging.

42. The computer program product of claim 40, wherein the communication request defines a non-IP-based identifier and a port number of a socket at the originating node.

43. The computer program product of claim 40, further comprising:
a third executable portion configured to verify at the terminating node a validity of the communication request using security information defined by the communication request.

44. The computer program product of claim 40, further comprising:
a third executable portion configured to create a virtual server socket between an application layer at the terminating node and a middleware layer at the terminating node;
a fourth executable portion configured to create a virtual client socket between an application layer at the originating node and a middleware layer at the originating node;
a fifth executable portion configured direct transmission of the communication request from the middleware layer at the originating node to the middleware layer at the terminating node via the non-IP-based communication technique;
a sixth executable portion configured to create a client socket between the middleware layer at the terminating node and a system layer at the terminating node; and
a seventh executable portion configured to create a server socket between the middleware layer at the originating node and a system layer at the originating node;
wherein the communication request is received at the terminating node by the middleware layer; wherein the communication request defines an IP address and a port number of the server socket at the originating node; and wherein the IP-based communication is initiated by the middleware layer at the terminating node.

45. The computer program product of claim 44, further comprising:

a third executable portion configured to receive a connect-successful message by the client socket at the terminating node;

a fourth executable portion configured to convert the connect-successful message by the middleware layer at the terminating node to an accept-successful message;

a fifth executable portion configured to receive the accept-successful message at the virtual socket at the terminating node;

a sixth executable portion configured to receive an accept-successful message by the server socket at the originating node;

a seventh executable portion configured to convert the accept-successful message by the middleware layer at the originating node to a connect-successful message; and an eighth executable portion configured to receive of the connect-successful message at the virtual socket at the originating node.

46. The computer program product of claim 40, wherein the private network comprises at least one of a firewall and a network address translator.

47. The computer program product of claim 40, wherein the communication request is free from inclusion of an IP address.

48. The computer program product of claim 40, wherein direct the initiation of the IP-based communication comprises establishing an IP-based communication link between the terminating node and the originating node to enable the receipt of the IP data.

\* \* \* \* \*